(12) United States Patent
Coron

(10) Patent No.: US 7,286,666 B1
(45) Date of Patent: Oct. 23, 2007

(54) COUNTERMEASURE METHOD IN AN ELECTRIC COMPONENT IMPLEMENTING AN ELLIPTICAL CURVE TYPE PUBLIC KEY CRYPTOGRAPHY ALGORITHM

(75) Inventor: Jean-Sébastien Coron, Paris (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 09/937,397

(22) PCT Filed: Mar. 22, 2000

(86) PCT No.: PCT/FR00/00723

§ 371 (c)(1),
(2), (4) Date: Apr. 1, 2002

(87) PCT Pub. No.: WO00/59157

PCT Pub. Date: Oct. 5, 2000

(30) Foreign Application Priority Data

Mar. 26, 1999 (FR) .................................. 09 03920

(51) Int. Cl.
*H04L 9/30* (2006.01)
(52) U.S. Cl. .......................................... 380/30; 380/28
(58) Field of Classification Search ............ 380/28–30, 380/46, 255; 713/174; 708/490–492
See application file for complete search history.

(56) References Cited

U.S. PATENT DOCUMENTS 6,064,740 A * 5/2000 Curiger et al. .............. 380/265
6,466,668 B1 * 10/2002 Miyazaki et al. ............. 380/30
6,914,986 B2 * 7/2005 Handschuh .................. 380/30

OTHER PUBLICATIONS

Paul Kocher ("Introduction to Differential Power Analysis and related Attacks" 1998).*
Eli Biham ("Differential Cryptanalysis of full 16-round DES", 1991).*
Toshio Hasegawa ("A practical Implementation of Elliptic Curve Cryptosystems over GF (p) on a 16-Bit Microcomputer", 1998).*
Jerome A. Solinas ("An Improved Algorithm for Arithmetic on a Family of Elliptic Curves" 1998).*
Koblitz, Neal, "*Elliptic Curve Cryptosystems*", Mathematics of Computation, Jan. 1987, vol. 48, No. 177, pp. 203-209.
Kocher, Paul, "*Timing Attacks on Implementations of Diffie-Hellman, RSA, DSS, and Other Systems*", Advances In Cryptology, Crypto '96, Santa Barbara, Ca, USA, Aug. 18-22, 1996, pp. 104-113.
Kocher, Paul et al, "*Introduction to Differential Power Analysis and Related Attacks*", Cryptography Research, Inc., Feb. 24, 2000, pp. 1-8.
Menkus, Belden, *Two Important Data Encryption Structures Reported Broken in Record Times*, EDPACS, Jan. 1999, Auerbach Publications, vol. 26, No. 7, pp. 15-18.

* cited by examiner

*Primary Examiner*—Kim Vu
*Assistant Examiner*—Nirav Patel
(74) *Attorney, Agent, or Firm*—Buchanan Ingersoll & Rooney PC

(57) ABSTRACT

A countermeasure method in an electronic component implementing an elliptical curve based public key cryptography algorithm. A new decryption integer d' is calculated such that the decryption of an encrypted message on the basis of a private key d and the number of points n of an elliptical curve provides the same result with d' as with d, by performing the operation Q=d*P, whereby P is a point of the curve. Four steps are employed in the calculation: 1) a security parameter s is determined, 2) a random number k ranging from $0-2^s$ is drawn, 3) the integer d'd+k*n is calculated, and 4) Q=d'.P is calculated.

15 Claims, No Drawings

COUNTERMEASURE METHOD IN AN ELECTRIC COMPONENT IMPLEMENTING AN ELLIPTICAL CURVE TYPE PUBLIC KEY CRYPTOGRAPHY ALGORITHM

This disclosure is based upon French Application No. 99/03920, filed on Mar. 26, 1999 and International Application No. PCT/FR00/00723, filed Mar. 22, 2000, which was published on Oct. 5, 2000 in a language other than English, the contents of which are incorporated herein by reference.

BACKGROUND OF THE INVENTION

The present invention relates to a countermeasure method in an electronic component implementing an elliptical curve type public key cryptography algorithm.

In the conventional model of secret key cryptography, two persons wishing to communicate by means of a non-secure channel must first agree on a secret enciphering key K. The enciphering function and the deciphering function implement the same key K. The drawback of the secret key enciphering system is that the said system requires the prior communication of the key K between the two persons by means of a secure channel, before any enciphered message is sent over the non-secure channel. In practice, it is generally difficult to find a perfectly secure communication channel, particularly if the distance separating the two persons is great. Secure channel means a channel for which it is impossible to know or modify the information passing over the said channel. Such a secure channel can be accomplished by means of a cable connecting two terminals, possessed by the said two persons.

The concept of public key cryptography was invented by Whitfield Diffie and Martin Hellman in 1976. Public key cryptography makes it possible to resolve the problem of the distribution of the keys over a non-secure channel. The principle of public key cryptography consists in using a pair of keys, a public enciphering key and a private deciphering key. It must be unfeasible from the calculation point of view to find the private deciphering key from the public enciphering key. A person A wishing to communicate information to a person B uses the public enciphering key of the person B. Only the person B possesses the private key associated with his public key. Only the person B is therefore capable of deciphering the message sent to him.

Another advantage of public key cryptography over secret key cryptography is that public key cryptography allows authentication by the use of an electronic signature.

The first embodiment of the public key enciphering scheme was developed in 1977 by Rivest, Shamir and Adleman, who invented the RSA enciphering system. RSA security is based on the difficulty of factorising a large number which is the product of two prime numbers.

Since then, many public key enciphering systems have been proposed, the security of which is based on different calculatory problems (this list is not exhaustive):

Merckle-Hellman backpack:

This enciphering system is based on the difficulty of the problem of the sum of subsets.

McEliece:

This enciphering system is based on the theory of algebraic codes. It is based on the problem of the decoding of linear codes.

El Gamal:

This enciphering system is based on the difficulty of the discrete logarithm in a finite field.

Elliptical curves:

The elliptical curve enciphering system constitutes a modification to existing cryptographic systems in order to apply them to the field of elliptical curves.

The use of elliptical curves in cryptographic systems was proposed independently by Victor Miller and Neal Koblitz in 1985. Actual applications of elliptical curves were envisaged early in the 1990s.

The advantage of cryptosystems based on elliptical curves is that they provide security equivalent to other cryptosystems but with smaller key sizes. This saving in key size entails a decrease in memory requirements and a reduction in calculation times, which makes the use of elliptical curves particularly suitable for applications of the smart card type.

An elliptical curve on a finite field $GF(q^n)$ (q being a prime number and n an integer) is the set of points (x,y) with x the X-axis and y the Y-axis belonging to $GF(q^n)$ the solution to the equation:

$$y^2 = x^3 + ax + b$$

if q is greater than or equal to 3 and $$y^2 + x*y = x^3 + a*x^2 + b$$

if q=2.

The two classes of elliptical curves which are most used in cryptography are the following classes:

1) Curves defined on the finite field GF(p) (the set of integers modulo p, p being a prime number) having as its equation:

$$y^2 = x^3 + ax = b$$

2) Elliptic curves on the finite field $GF(2^n)$ having as its equation $y^2 + xy = x^3 + ax^2 + b$ For each of these two classes of curves, an operation of addition of points is defined: given two points P and Q, the sum R=P+Q is a point on the curve, the coordinates of which are expressed by means of the coordinates of the points P and Q in accordance with formulae whose expression is given in the work "Elliptic Curve Public Key Cryptosystem" by Alfred J Menezes.

This addition operation makes it possible to define a scalar multiplication operation: given a point P belonging to an elliptical curve and an integer d, the result of the scalar multiplication of P by a point d such that Q=d.P=P+PP . . . +P d times.

The security of cryptography algorithms on elliptical curves is based on the difficulty of the discrete logarithm on elliptical curves, the said problem consisting, using two points Q and P belonging to an elliptical curve E, in finding, if such exists, an integer x such that Q=x.P.

There are many cryptographic algorithms based on the problem of the discrete logarithm.

These algorithms are easily transposable to elliptical curves. Thus it is possible to use algorithms providing authentication, confidentiality, integrity check and key exchange.

A point common to the majority of cryptographic algorithms based on elliptical curves is that they comprise as a parameter an elliptical curve defined on a finite field and a point P belonging to this elliptical curve. The private key is an integer d chosen randomly. The public key is a point on the curve Q such that Q=d.P. These cryptographic algorithms generally involve a scalar multiplication in the calculation of a point R=d.T, where d is the secret key.

In this section, an enciphering algorithm based on an elliptical curve is described. This scheme is similar to the El Gamal enciphering scheme. A message m is enciphered as follows:

The cipher clerk chooses an integer k randomly and calculates the points k.P=(x1,y1) and k.Q=(x2,y2) on the curve, and the integer c=x2+m. The cipher of m is the triplet (x1,y1,c).

The deciphering clerk, who possesses d, deciphers m by calculating:

$$(x2,y2)=d(x1,y1) \text{ and } m=c-x2$$

In order to effect the scalar multiplications necessary in the calculation methods described previously, several algorithms exist:

"Double and add" algorithm;
"Addition-subtraction" algorithm;
Algorithm with addition chains;
Algorithm with window;
Algorithm with signed representation.

This list is not exhaustive. The simplest algorithm and the one which is most used is the "double and add" algorithm. The "double and add" algorithm takes as its input a point P belonging to a given elliptical curve and an integer d. The integer d is denoted d=(d(t),d(t−1), ... ,d(0)), where (d(t),d(t−1), ... ,d(0)) is the binary representation of d, with d(t) the most significant bit and d(0) the least significant bit. The algorithm returns as an output the point Q=d.P.

The "double and add" algorithm includes the following three steps:

1) Initialising the point Q with the value P
2) For i ranging from t−1 to 0, executing:
2a) Replacing Q with 2Q
2b) If d(i)=1 replacing Q with Q+P
3) Returning Q.

It became clear that the implementation of a public key enciphering algorithm of the elliptical curve type on a smart card was vulnerable to attacks consisting of a differential analysis of current consumption making it possible to find the private deciphering key. These attacks are known as DPA attacks, the acronym for Differential Power Analysis. The principle of these DPA attacks is based on the fact that the current consumption of the microprocessor executing the instructions varies according to the data item being manipulated.

In particular, when an instruction is manipulating a data item in which a particular bit is constant, where the value of the other bits may vary, analysis of the current consumption related to the instruction shows that the mean consumption of the instruction is not the same according to whether the particular bit takes the value 0 or 1. The attack of the DPA type therefore makes it possible to obtain additional information on the intermediate data manipulated by the microprocessor of the card when a cryptographic algorithm is being executed. This additional information can in some cases reveal the private parameters of the deciphering algorithm, making the cryptographic system insecure.

In the remainder of this document a description is given of a method of DPA attack on an algorithm of the elliptical curve type performing an operation of the type consisting of the scalar multiplication of a point P by an integer d, the integer d being the secret key. This attack directly reveals the secret key d. It therefore seriously compromises the security of the implementation of elliptical curves on a smart card.

The first step of the attack is the recording of the current consumption corresponding to the execution of the "double and add" algorithm described previously for N distinct points P(1), ... , P(N). In an algorithm based on elliptical curves, the microprocessor of the smart card will perform N scalar multiplications d.P(1), ... ,d.P(N).

For clarity of the description of the attack, the first step is to describe a method for obtaining the value of the bit d(t−1) of the secret key d, where (d(t),d(t−1), ... ,d(0)) is the binary representation of d, with d(t) the most significant bit and d(0) the least significant bit. Next the description of an algorithm which makes it possible to find the value of d is given.

The points P(1) to P(N) are grouped together according to the value of the last bit of the abscissa of 4.P, where P designates one of the points P(1) to P(N). The first group consists of the points P such that the last bit of the abscissa of 4.P is equal to 1. The second group consists of the points P such that the last bit of the abscissa of 4.P is equal to 0. The mean of the current consumptions corresponding to each of the two groups is calculated, and the difference curve between these two means is calculated.

If the bit d(t−1) of d is equal to 0, then the scalar multiplication algorithm previously described calculates and stores in memory the value of 4.P. This means that, when the algorithm is executed in a smart card, the microprocessor of the card will actually calculate 4.P. In this case, in the first message group, the last bit of the data item manipulated by the microprocessor is always at 1, and in the second message group the last bit of the data item manipulated is always at 0. The mean of the current consumptions corresponding to each group is therefore different. There therefore appears, in the difference curve between the two means, a differential current consumption peak.

If on the other hand the bit d(t−1) of d is equal to 1, the exponentiation algorithm described previously does not calculate the point 4.P. When the algorithm is executed by the smart card, the microprocessor therefore never manipulates the data item 4.P. Therefore no differential consumption peak appears.

This method therefore makes it possible to determine the value of the bit d(t−1) of d.

The algorithm described in the following section is a generalisation of the previous algorithm. It makes it possible to determine the value of the secret key d:

The input is defined by N points denoted P(1) to P(N) corresponding to N calculations performed by the smart card, and the output by an integer h.

The said algorithm is implemented as follows in three steps.

1) Executing h=1;
2) For i ranging from t−1 to 1, executing:
   2)1) Classifying the points P(1) to P(N) according to the value of the last bit of the abscissa of (4*h).P;
   2)2) Calculating the current consumption mean for each of the two groups;
   2)3) Calculating the difference between the two means;
   2)4) If the difference shows a differential consumption peak, doing h=h*2; otherwise doing h=h*2+1;
3) Returning h.

The above algorithm supplies an integer h such that d=2*h or d=2*h+1. In order to obtain the value of d, it then suffices to test the two possible hypotheses.

The attack of the DPA type described therefore makes it possible to find the private key d.

DESCRIPTION OF THE INVENTION

The method of the invention consists of in devising of three countermeasures to guard against the DPA attack described above.

The method of the first countermeasure consists in calculating, from the private key d and the number of points N on the elliptical curve, a new deciphering integer d', such that the deciphering of any enciphered message with d' gives the same result as with d.

In the case of a cryptographic algorithm based on the use of elliptical curves performing the operation Q=d.P where d is the private key and P a point on the curve, the calculation of Q=d.P is replaced by the following method in four steps:

1) Determining a security parameter s; in practice s can be taken close to 30.
2) Drawing a random number k between 0 and $2^s$.
3) Calculating the integer d'=d+k*n.
4) Calculating Q=d'.P.

The method of the first countermeasure comprises two variants which relate to the updating of the integer d'. The first variant consists of the fact that a new deciphering integer d' is calculated at each new execution of the deciphering algorithm, according to the method described previously. The second variant consists of the fact that a counter is incremented at each new execution of the deciphering algorithm. When this counter reaches a fixed value T, a new deciphering integer d' is calculated according to the method described previously, and the counter is reset to zero. In practice, T=16 can be taken.

The method of the first countermeasure therefore makes the previously described DPA attack impossible by changing the deciphering integer d.

The method of the second countermeasure applies to the first class of curves previously described, that is to say the curves defined on the finite field GF(p) having as its equation $y^2=x^3+ax+b$. The method of the second countermeasure consists in using a random calculation modulus at each new execution. This random modulus is of the form p'=p*r where r is a random integer. The scalar multiplication operation Q=d.P performed in an algorithm based on an elliptical curve is then performed according to the following method in five steps:

1) Determining a security parameter s; in practice, s can be taken to be close to the number 60.
2) Drawing the random number r whose binary representation makes s bits.
3) Calculating p'=p*r.
4) Executing the scalar multiplication operation Q=d.P, the operations being performed modulo p'.
5) Performing the reduction operation modulo p of the coordinates of the point Q.

The method of the second countermeasure comprises two variants which relate to the updating of the integer r. The first variant consists of the fact that a new integer r is calculated at each new execution of the deciphering algorithm, according to the method described previously. The second variant consists of the fact that a counter is incremented at each new execution of the deciphering algorithm. When this counter reaches a fixed value T, a new integer r is calculated according to the method described previously, and the counter is reset to zero. In practice, T+16 can be taken.

The method of the third countermeasure consists in "masking" the point P to which it is wished to apply the scalar multiplication algorithm by adding a random point R to it.

The method of scalar multiplication of a point P by an integer d according to Q=d.P comprises the following five steps:

1) Drawing a random point R on the curve.
2) Calculating P'=P+R.
3) Scalar multiplication operation Q'=d.P'.
4) Scalar multiplication operation S=d.R.
5) Calculating Q=Q'−S.

The method of the third countermeasure comprises three variants. The first variant consists of the fact that a counter is incremented at each new execution of the deciphering algorithm. When the deciphering algorithm is first executed, the algorithm is executed according to the five-step method described above. As long as the counter has not reached the limit value T, steps 1 and 4 of the method described above are not executed, the points R and S keeping the values taken during the previous execution. When the counter reaches the limit value T, the deciphering algorithm is implemented according to the method described previously in five steps, and the counter is reset to zero. In practice, T=16 can be taken.

The second variant consists of the fact that the card initially has in memory two points on the elliptical curves such that S=d.R. Steps 1 and 4 of the previous deciphering algorithm are replaced by the following steps 1' and 4':

1') Replacing R with 2.R.
4') Replacing S with 2.S.

The third variant consists of a modification of the second variant characterised in that a counter is incremented at each new execution of the deciphering algorithm. When the deciphering algorithm is first executed, the algorithm is executed according to the five-step method of the second variant described above. As long as the counter has not reached a limit value T, steps 1' and 4' of the method described above are not executed, points r and S keeping the values taken during the previous execution. When the counter reaches a limit value T, the deciphering algorithm is implemented according to the method previously described in five steps, and the counter is reset to zero. In practice, T=16 can be taken.

The application of the above three countermeasure methods makes it possible to protect any cryptographic algorithm based on elliptical curves against the DPA attack described above. The three countermeasures presented are also compatible with each other: it is possible to apply to the RSA deciphering algorithm one, two or three of the countermeasures described.

The invention claimed is:

1. A countermeasure method in an electronic component implementing a public key cryptography algorithm based on the use of elliptical curves in which a deciphering integer d' is calculated, using a private key d and a number of points n on an elliptical curve, such that the deciphering of any enciphered message, by means of a deciphering algorithm, with d', gives the same result as with d, by effecting the operation Q=d*P, where P is a point on the curve, said method including the following steps:

1) determining a security parameter s;
2) drawing a random number k between 0 and $2^s$;
3) calculating the integer d'=d+k*n; and
4) calculating Q=d'*P.

2. A countermeasure method according to claim 1, wherein a new deciphering integer d' is calculated at each new execution of the deciphering algorithm.

3. A countermeasure method according to claim 1, further including the step of incrementing a counter at each new execution of the deciphering algorithm until a fixed value T is reached.

4. A countermeasure method according to claim 3, wherein, once the value T has been reached, a new deciphering integer is calculated and the counter is reset to zero.

5. A countermeasure method according to claim 3, wherein the value T is equal to the integer 16.

6. A countermeasure method in an electronic component implementing a public key cryptography algorithm based on the use of elliptical curves defined on a finite field GF(p), where p is a prime number, according to the equation $y^2=x^3+ax+b$ and where a random calculation modulus of the form p'=p*r, where r is a random integer, is used at each new execution of the algorithm, said method including the execution of a scalar multiplication operation according to the following steps:

1) determining a security parameter s;
2) drawing a random number r whose binary representation comprises s bits;
3) calculating p'=p*r;
4) executing the scalar multiplication operation Q=d.P, where P is a point on a curve, and said operation is performed modulo p'; and
5) performing the reduction operation modulo p of the coordinates of the point Q.

7. A countermeasure method according to claim 6, wherein a new integer is calculated at each new execution of the cryptography algorithm.

8. A countermeasure method according to claim 6, further including the step of incrementing a counter at each new execution of the cryptography algorithm.

9. A countermeasure method according to claim 8, wherein the counter is reset to zero when it has reached a value T.

10. A countermeasure method according to claim 9, wherein the value T is equal to sixteen.

11. A countermeasure method in an electronic component implementing a public key cryptography algorithm based on the use of elliptical curves in which a new deciphering key d' is calculated, using the private key d and a number of points n on an elliptical curve, such that the deciphering of any enciphered message, by means of a deciphering algorithm, with d', gives the same result as with d, by performing the operation Q=d*P, where P is a point on the curve to which a scalar multiplication algorithm is applied, said method comprising the following steps:

1) drawing a random point R on the curve;
2) calculating P'=P+R;
3) performing the scalar multiplication operation Q'=d.P';
4) performing the scalar multiplication operation S=d.R; and
5) calculating Q=Q'−S.

12. A countermeasure method according to claim 11, further including the step of incrementing a counter at each new execution of the deciphering algorithm up to a value T.

13. A countermeasure method according to claim 12, wherein the counter is reset to zero once the value T has been reached.

14. A countermeasure method according to claim 11, wherein the elliptical curve has two points such that S=d*R, and wherein steps 1 and 4 are replaced by the following steps 1' and 4':

1') Replacing R with 2.R;
4') Replacing S with 2.S.

15. A countermeasure method according to claim 14, further including the step of incrementing a counter at each new execution of the deciphering algorithm up to a value T.

\* \* \* \* \*